No. 732,042. PATENTED JUNE 30, 1903.
J. S. BRIDGES.
MOISTURE AND RUST TRAP FOR AIR PIPES.
APPLICATION FILED DEC. 17, 1902.
NO MODEL.

WITNESSES:
W. N. Canby.
A. M. Piddle

INVENTOR
John S. Bridges
BY H. V. Hutou
ATTORNEY.

No. 732,042. Patented June 30, 1903.

UNITED STATES PATENT OFFICE.

JOHN SAMUEL BRIDGES, OF BALTIMORE, MARYLAND.

MOISTURE AND RUST TRAP FOR AIR-PIPES.

SPECIFICATION forming part of Letters Patent No. 732,042, dated June 30, 1903.

Application filed December 17, 1902. Serial No. 135,493. (No model.)

*To all whom it may concern:*

Be it known that I, JOHN SAMUEL BRIDGES, a citizen of the United States, residing in the city of Baltimore, State of Maryland, have invented certain new and useful Improvements in Moisture and Rust Traps for Air-Pipes, of which the following is a full, clear, and exact description, reference being had to the accompanying drawings, forming a part of this specification.

My invention relates to devices for trapping and blowing off moisture and loose rust which naturally accumulates in compressed-air pipes and is well adapted to be used for such purpose in connection with locomotive sanding devices which are operated by air-blast delivered thereto from the main reservoir of the engine through connecting air-pipes, which in practice become inefficient, because of moisture and loose rust collecting therein and choking the air-nozzle of the sander.

To these ends my invention consists in a trap composed of a hollow body having oppositely-disposed inlet and outlet ports near the top thereof and an interior deflecting-plate projecting downward from the inner top wall and disposed about midway between said ports, so as to deflect the incoming air and loose rust downwardly and around the same and out of alinement with the outlet-port of the trap, the chamber formed by the hollow interior of the trap having some depth comparatively to serve as a temporary receptacle for such moisture and rust and provided at its base with a removable cleaning-plug.

My invention also consists in the combination, with a trap so constructed and a line of piping leading to its inlet-port, of a blow-off cock the shell whereof is provided with an aperture leading to the open air, and the plug thereof has an additional passage which will register with said aperture in the shell when the cock is so turned as to shut off the usual communication through the same between the air-piping and the moisture-trap; also, in galvanizing the interior walls of said combined elements and the air-supply pipe leading thereto.

Figure 1:
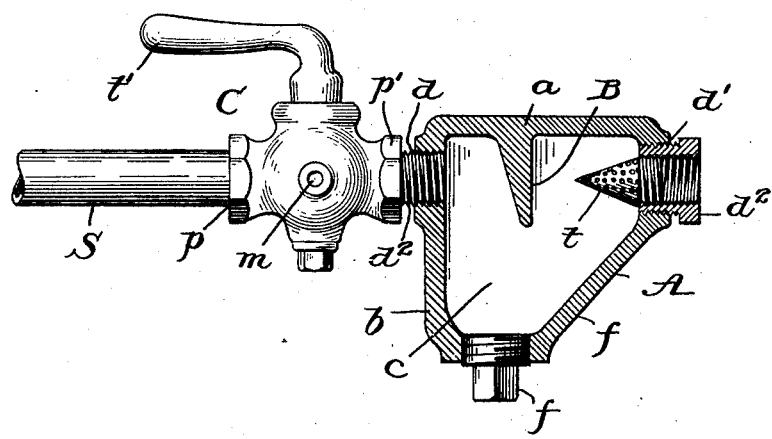
Figure 2:
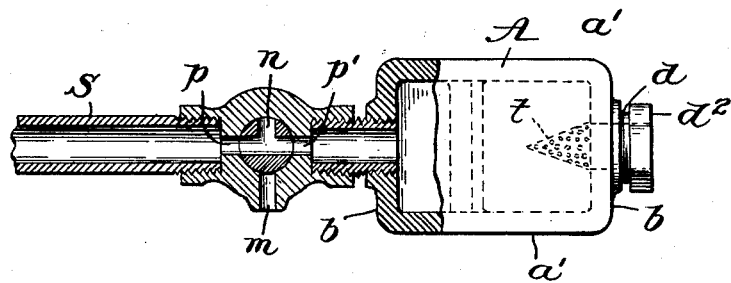

In the drawings illustrating my invention, Figure 1 is a side elevation of the blow-off cock and vertical section of the moisture and rust trap, showing these parts in connected operative relation; and Fig. 2 is a lateral sectional view of the device, both views showing broken off the air-tube leading thereto from the engine.

Referring to said drawings, the trap proper is a hollow body A, preferably cast integral, having a substantially flat vertical top wall $a$, side walls $a'\,a'$, and end walls $b\,b$ and having some considerable depth to form a receiving-chamber $c$. Oppositely-disposed inlet and outlet ports $d\,d'$ are provided in the end walls $b\,b$, near the top thereof, the port-plugs $d^2\,d^2$ having screw-threaded ends to supply connecting means. Depending interiorly from the top wall $a$, about midway in the length thereof, and consequently about midway between the inlet and outlet ports, is a deflecting-plate B, extending downward into the chamber $c$ somewhat below the horizontal plane of the ports $d\,d'$.

Covering the interior end of the outlet-port is a screen $t$, shown in the drawings as a perforated thimble, the object being to prevent as far as possible particles of rust passing out of the chamber and into the outlet-port. At the base of the chamber $c$ and of the trap-body A is a removable cleaning-plug $f$, whereby condensed moisture and rust particles may be withdrawn from the trap.

The deflecting-plate, as well as the whole interior of the chamber $c$ and its ports, the connecting air-passages, and the interior passage of the interposed blow-off cock above referred to and hereinafter described are galvanized to further prevent rust formation, and this interior galvanizing I extend to the interior of the whole length of connecting-pipe D, leading to the engine.

My trap finds its chief utility in preventing moisture and rust particles passing to the valve and port-passages of locomotive sanding devices when employed in combination therewith and with a three-ported blow-off cock and connecting air-pipe leading thereto from the engine. This blow-off cock is not only in the combination and arrangement just mentioned, but elementally a novel feature of my invention. As shown in the side elevation Fig. 1, the shell C is made, as usual, with opposite port-opening $p\,p'$; but in addition thereto I provide a blow-off port *m* at right angles to the port *p p'* to establish communication between them; but when turned (see the sectional view Fig. 2) by the handle *t'* the intermediate port *n* (with which the plug is provided) will be brought into register with the blow-off port *m* in the shell C and establish communication between the inlet-port *p* and the open air, while closing the outlet-port *p'* completely. This blow-off cock is provided with suitable connecting devices at its outlet-port (see Fig. 1) with the inlet-port of the trap, and at its inlet-port it is suitably connected with the air-supply pipes leading from the engine.

The operation of the device is as follows: In locomotive sanding devices it has been found that moisture and rust particles clog the passages, cutting off or reducing effective pressure at its most important point and crippling the operativeness of the device. The galvanized interior walls of the trap, of the blow-off cock, and of the air-pipe leading from the engine thereto will largely prevent the formation of rust. Scale collecting in the air-supply pipe leading from the engine to the trap through the interposed blow-off cock is easily discharged through the blow-off port in the plug and shell of the latter when they are brought into register by a turn of the operating-handle. In the normally operative position of the blow-off cock the compressed air enters the inlet of the trap, and contained moisture is deflected downward by the deflecting-plate into the receiving-chamber of the trap. The perforated thimble covering the outlet-port of the trap assists in preventing moisture and scale from passing to said outlet-port. The sanding device with which the apparatus is used is therefore effectually screened from such foreign bodies. Any accumulation of moisture, rust, or dirt caught in the trap-chamber may be removed through the basal opening therein, which is normally closed by the cleaning-plug.

Having thus described my invention, what I claim as new, and desire to secure by Letters Patent, is—

1. A moisture and rust trap for compressed-air pipes, consisting essentially of a hollow body the walls of which form an inclosed receiving-chamber, having oppositely-disposed inlet and outlet ports, a deflecting-plate in said chamber interposed between said ports, and a blow-off port at the base of said chamber; substantially as and for the purpose set forth.

2. A trap of the class described consisting of a hollow body the walls of which form an interior chamber having oppositely-disposed inlet and outlet ports near the top thereof, means to removably connect said ports with a line of piping or other coöperative devices, a blow-off port at the base of said interior chamber, with means to control the same, and a deflecting-plate dependent from the top of said chamber, interposed therein between the inlet and outlet ports, and extending slightly below the horizontal plane thereof; substantially as described.

3. A trap of the class described consisting essentially of a body which is made hollow interiorly to form a receiving-chamber and having inlet and outlet ports in its walls, with means to retard and check the passage of foreign substances through the same and through the outlet-port thereof, of a controlling two-way cock composed of a shell and a plug each having a supplemental discharge-port adapted to be brought into register when the usual oppositely-disposed ports in the plug are in closed position, relatively to each other, within the shell; and a line of air-piping suitably connected with the inlet of said controlling-cock; substantially as described.

In testimony whereof I have hereunto affixed my signature this 10th day of December, A. D. 1902.

JOHN SAMUEL BRIDGES.

Witnesses:
MILLARD LEONARD,
J. C. HAYNE.